(12) United States Patent
Richardson et al.

(10) Patent No.: US 8,538,781 B2
(45) Date of Patent: Sep. 17, 2013

(54) WORKERS COMPENSATION SYSTEM FOR DETERMINING A COST OF INSURANCE

(75) Inventors: John H. Richardson, Wilkes-Barre, PA (US); Carl J. Witkowski, Duryea, PA (US)

(73) Assignee: Guard Insurance Group, Wilkes-Barre, PA (US)

( * ) Notice: Subject to any disclaimer, the term of this patent is extended or adjusted under 35 U.S.C. 154(b) by 1170 days.

(21) Appl. No.: 11/381,676

(22) Filed: May 4, 2006

(65) Prior Publication Data

US 2006/0253306 A1 Nov. 9, 2006

Related U.S. Application Data

(60) Provisional application No. 60/677,410, filed on May 4, 2005.

(51) Int. Cl.
*G06Q 40/00* (2012.01)

(52) U.S. Cl.
USPC .................................................. 705/4; 705/35

(58) Field of Classification Search
USPC ............................................................ 705/4
See application file for complete search history.

(56) References Cited

U.S. PATENT DOCUMENTS

| 5,797,134 | A | 8/1998 | McMillan et al. | |
|---|---|---|---|---|
| 6,604,080 | B1 * | 8/2003 | Kern | 705/4 |
| 2002/0046064 | A1 * | 4/2002 | Maury et al. | 705/4 |
| 2003/0229522 | A1 * | 12/2003 | Thompson et al. | 705/4 |
| 2004/0103012 | A1 * | 5/2004 | Nussbaum et al. | 705/4 |
| 2004/0267595 | A1 * | 12/2004 | Woodings et al. | 705/9 |

OTHER PUBLICATIONS

"Paychex Teams Up With the Hartford to Help Small Businesses Manage Workers' Compensation Costs", Jun. 15, 1999, Business Wire.*

* cited by examiner

*Primary Examiner* — Charles Kyle
*Assistant Examiner* — Irene Kang
(74) *Attorney, Agent, or Firm* — IP Authority, LLC; Ramraj Soundararajan (57) ABSTRACT

A system for monitoring a business's operational characteristics and employee classifications, in real time, to obtain increased amounts of data relating to the total compensation for purposes of providing a more accurate determination of a cost of insurance for the risk, on a real-time basis, and to bill such charges directly to the risk according to their unique finance plan in direct relation to their payroll cycle.

13 Claims, 4 Drawing Sheets

Risk: Sample Policy
Effective Dates: 07/17/2004 thru 07/17/2005
State: Pennsylvania

| Description | State | Misc. | Code | Premium Basis | Rate | Estimated Premium |
|---|---|---|---|---|---|---|
| Effective 07/17/2000 - 02/01/2001 | | | | | | |
| | | | | | | |
| Automobile Service Centers | PA | | 0815 | 69,751 | 4.12 | 2,874.00 |
| Clerical Office Employees | PA | | 0953 | 27,348 | 0.29 | 79 |
| Experience Modification | PA | 0.968 | 9898 | 0 | | -94.00 |
| | | | | | | |
| Effective 02/01/2001 - 07/17/2001 | | | | | | |
| | | | | | | |
| Automobile Service Employees | PA | | 0815 | 58,184 | 4.42 | 2,572.00 |
| Clerical Office Employees | PA | | 0953 | 22,812 | 0.33 | 75.00 |
| Experience Modification | PA | 0.968 | 9898 | 0 | | -85 |
| | | | | | | |
| Premium Discount | PA | 0.849 | 0063 | | | -46.00 | liability limits  $100,000./$300,000./$50,000.
deductibles     $500./$500.

WORKERS COMPENSATION SYSTEM FOR DETERMINING A COST OF INSURANCE

RELATED APPLICATION

This application claims priority benefit to U.S. provisional application 60/577,410 filed May 4, 2005, which is incorporated herein by reference in its entirety.

BACKGROUND OF THE INVENTION

1. Field of Invention

The present invention relates generally to the field of insurance. More specifically, the present invention is related to insurance cost calculations.

2. Discussion of Prior Art

Conventional methods for determining costs of workers compensation insurance involve gathering relevant historical data from a personal interview with the applicant for the insurance and by referencing the applicant's prior insurance records that are maintained by a governmental agency, such as a Bureau of Workers Compensation Insurance, if such records exist. Such data results in a classification of the applicant to a broad actuarial class for which insurance rates are assigned based upon the empirical experience of the insurer. Many factors are relevant to such classification in a particular actuarial class, such as type of employee, hours worked, location of work, exposure classification, etc, and the cost is based upon projected payroll and type of occupations expected within the insured's business over the next year.

Figure 1:
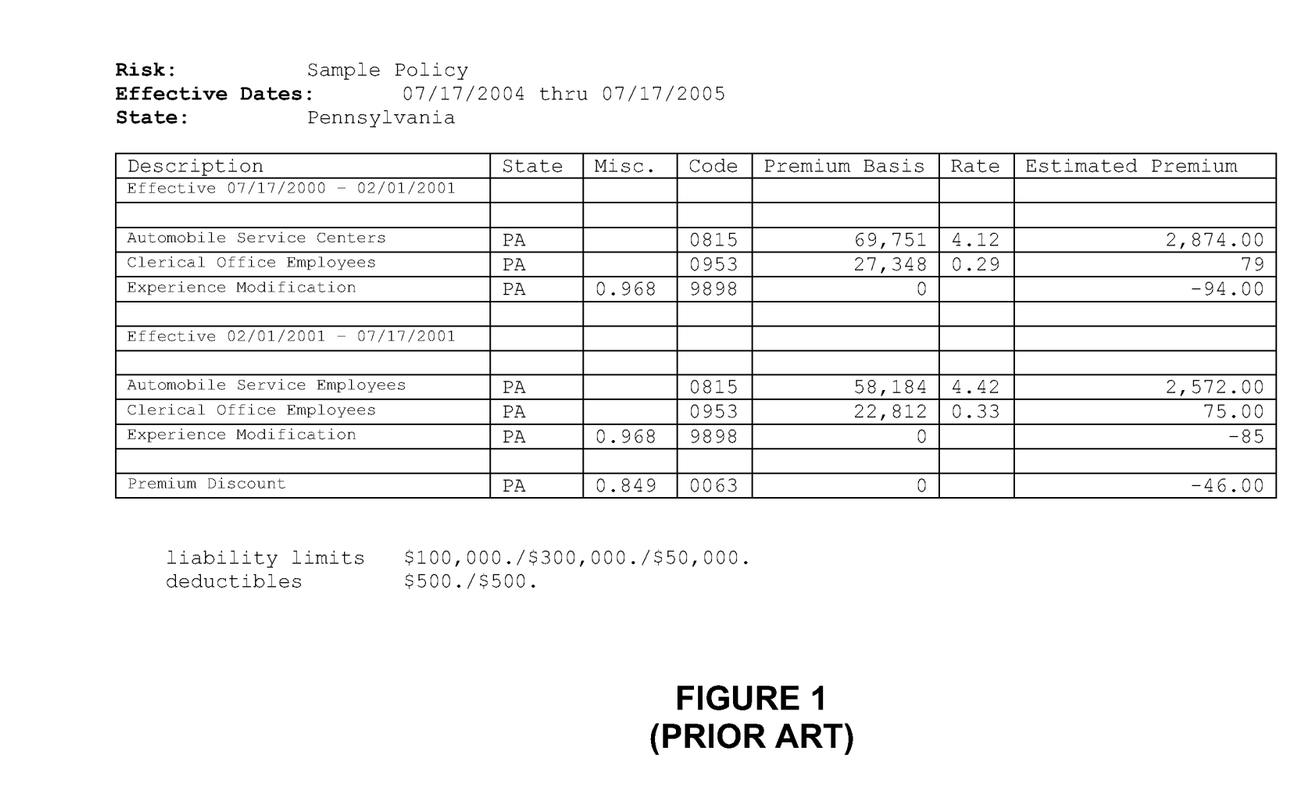
FIG. 1 illustrates a prior art system including classifications, such as payroll, broken into actuarial classes, used to develop a unique risk insurance cost based on the specific combination of actuarial classes for a particular risk.

The current system of insurance creates groupings of risks (actuarial classes) based on the following types of classifications:

Number of Employees
Payroll
Actuarial Classification Codes
State of coverage
Experience Mod
Included Officers Coverage
Types of previous losses
Liability limits
State deductibles
Credits The classifications, such as payroll, are further broken into actuarial classes, to develop a unique risk insurance cost based on the specific combination of actuarial classes for a particular risk. The example shown in FIG. 1 would produce a unique insurance cost.

A change to any of this information would result in a different premium being charged, if the change resulted in a different actuarial class for that variable. For instance, a change in the risk's payroll from 58 thousand to 57 thousand may or may not result in a different actuarial class, however, a change in an employee's classification from 0815 to 0953 may result in a different premium because of the change in actuarial class.

A principal problem with such conventional insurance determination systems is that much of the data gathered from the applicant in the interview is not verifiable or is used as a snapshot of the insured's exposures only at that moment in time, and even existing public records contain only minimal information, much of which has little relevance towards an assessment of the likelihood of a claim subsequently occurring and obtaining premium based upon actual exposures versus a retrospective analysis at policy termination. In other words, current rating systems are primarily based on past realized losses, projected conditions of the risk's payroll, classes, size and employee population, which are projected over the life of the policy, usually one year. This data is usually not updated until the end of the policy term, wherein an insurance company exercises its right to audit the business to determine more accurately the number of employees, their actual payroll, and other factors. None of the information obtained through conventional systems necessarily reliably predicts the manner or safety of future employer activities. Accordingly, the limited amount of accumulated time sensitive, relevant data, and its minimal evidential value towards computation of a fair cost of insurance has generated a long-felt need for an improved system for more reliably and accurately accumulating data having a highly relevant evidential value towards predicting the actual payroll and classification changes of the risk. In addition, the changes in premium that result from these predictions is charged or credited directly to the risk to better facilitate cash flow management techniques.

Many types of workers compensation data collection systems have heretofore been suggested for purposes of maintaining an accurate record of certain elements of a risk's operation. Some are suggested for identifying the cause of a loss, others are for more accurately assessing the efficiency of classifying the employee's of the risk. Such systems disclose a variety of conventional techniques for collecting the risk's operational data elements in a variety of data collection systems.

The various forms and types of risk company information acquisition systems that have heretofore been suggested and employed have met with varying degrees of success for their express limited purposes. All possess substantial defects, such that they have only limited economical and practical value for a system intended to provide an enhanced acquisition, recording and uploading of system of data which would be both comprehensive and reliable in predicting an accurate and adequate cost of insurance for the risk. Since the type of company operating information acquired and recorded in prior art systems was generally never intended to be used for determining an updated cost of workers compensation insurance, the data elements that were monitored and recorded therein were not directly related to predetermined safety standards or the determining of an actuarial class for the employees. There is also the problem of collecting and subsequently compiling the relevant data for an accurate determination of an actuarial profile and an appropriate insurance cost therefore.

Current payroll control and operating systems comprise electronic data reporting systems readily adaptable for modification to obtain the desired types of information relevant to determination of the cost of insurance. Payroll tracking systems have been suggested which use uploads to back-end audit systems for providing information describing a risk's changes to the original insurance application. When such information is combined with additional information in an expert system, a risk's premium is ascertainable. Mere back-end audit information, though, will not provide data particularly relevant to the actuarial class of operation unless the data is combined with other relevant data in an expert system which is capable of assessing whether the change is relevant to the policy's terms or not, and, in addition, it is not real-time, which does not afford the carrier the opportunity to prevent potential losses, such as applying Loss Control services.

Typically, workers compensation premiums are derived from information obtained directly from the risk at the inception of the policy's term, and then, again through a payroll audit conducted at the end of a policy's term. This causes, in some cases, a materially significant difference in premium costs, if the conditions of the policy's exposure, changes considerably from policy inception to audit. There is a need in the industry to "flatten" out this change in premium by monitoring a risk's payroll and manage the risk (which is accomplished through a payroll-processing monitoring system) electronically, and then, adjusting the policy's premium reflective of the actual, current risk and spreading the difference in cost over the life of the policy to more accurately reflect the real exposure of the risk.

Whatever the precise merits, features, and advantages of the above mentioned prior art techniques, none of them achieves or fulfills the purposes of the present invention.

SUMMARY OF THE INVENTION

A method and system of determining a cost of workers compensation insurance based upon monitoring, collecting, and communicating data representative of the risk's "real time" number of employees, classification of employees, payroll, and other characteristics by acquiring this data through the risk's "payroll processor". The cost is therefore adjustable concurrently and prospectively by relating the employer's business characteristics, and payroll information received from their payroll processor or payroll processing system via predetermined transfer of information via an EDI (Electronic Data Interface). The method comprises steps of monitoring a plurality of raw data elements representative of a risk's employment practices or an action of the risk. Selected raw data elements are evaluated when they are determined to have an identified relationship to the insurability of the risk. The selected data elements are consolidated for processing against an insurer profile and for identifying an increase or reduction to be applied to a base cost of workers compensation insurance. A final cost is produced from the base costs and the surcharges or discounts as mandated by state compensation rating bureaus. This cost is then directly charged, or credited, directly to the risk via their finance plan. This allows the risk to pay the premium in installments into their pay periods and reflect the actual exposures, resulting in fewer variations at the time of the insurance company's audit, and allowing the carrier to make real-time decisions regarding continued insurability of the risk and/or apply risk management or loss control scenarios to the risk.

The present invention provides for a computer-based method implemented at an insurance company to estimate a final premium charge and more accurate real time estimate during the lifetime of the policy for workers compensation insurance associated with a risk, wherein the method comprises: the insurance company receiving real-time payroll data associated with the risk; the insurance company monitoring the received real-time payroll data to identify and record raw data elements that have an identified relationship with any of, or a combination of, the following: the risk's business operation, insurability of the risk, character of the risk, or rating parameters associated with the risk's policy; and the insurance company determining the final premium charge of workers compensation insurance for said risk based on a premium modification that increases or decreases a premium charge based on an evaluation of said recorded raw data elements.

The present invention provides for a computer-based method to determine a final premium charge and more accurate real time estimate during the lifetime of the policy for workers compensation insurance associated with a risk, wherein the computer-based method comprises the steps of: monitoring a set of raw data elements, the raw data elements associated with any of, or a combination of, the following: the risk's employment practice, the risk's payroll, modification to the risk's payroll, or operating state of the risk; identifying and recording a subset of the raw data elements that have an identified relationship with any of, or a combination of, the following: the risk's business operation, insurability of the risk, character of the risk, or rating parameters associated with the risk's policy; and determining the final premium charge of workers compensation insurance of the risk based on a premium modification that increases or decreases a premium charge based on an evaluation of the recorded subset of raw data elements.

The present invention also provides for an article of manufacture comprising a computer usable medium having computer readable program code embodied therein which implements a method to estimate a final premium charge and more accurate real time estimate during the lifetime of the policy for workers compensation insurance associated with a risk, wherein the medium comprises: computer readable program code monitoring a set of raw data elements, the raw data elements associated with any of, or a combination of, the following: the risk's employment practice, the risk's payroll, modification to the risk's payroll, or operating state of the risk; computer readable program code identifying and recording a subset of the raw data elements that have an identified relationship with any of, or a combination of, the following: the risk's business operation, insurability of the risk, character of the risk, or rating parameters associated with the risk's policy; and computer readable program code determining the final premium charge of workers compensation insurance of the risk based on a premium modification that increases or decreases a premium charge based on an evaluation of said recorded subset of raw data elements.

The present invention also provides for a business method implemented over a network to estimate a final premium charge and more accurate real time estimate during the lifetime of the policy for workers compensation insurance associated with a risk, wherein the business method comprising the steps of: monitoring a set of raw data elements, the raw data elements associated with any of, or a combination of, the following: the risk's employment practice, the risk's payroll, modification to the risk's payroll, or operating state of the risk; identifying and recording a subset of the raw data elements that have an identified relationship with any of, or a combination of, the following: the risk's business operation, insurability of the risk, or rating parameters associated with the risk's policy; determining the final premium charge of workers compensation insurance of the risk based on a premium modification that increases or decreases a premium charge based on an evaluation of the recorded subset of raw data elements; and generating revenue by performing a financial transaction over the network based on the determined final premium charge.

The present invention also provides for a method of determining a cost of workers compensation insurance for a selected period based upon monitoring, collecting and communicating data representative of the risk's payroll characteristics during said selected period, whereby the cost is adjustable by relating the payroll characteristics to predetermined actuarial rates and the method comprises the steps of: determining an initial profile and a base cost of workers compensation insurance based on the profile; monitoring a plurality of data elements representative of payroll and business status of a risk during said selected period; identifying and analyzing data elements among the plurality of data elements that have a pre-identified relationship to the risk's insurability; consolidating the analyzed data elements for identifying a surcharge or discount to be applied to the base cost; and producing a final cost of workers compensation insurance for the selected period from the base cost and the surcharges or discounts to be billed directly to the risk based on their finance plan, whereby the risk is charged or credited said final cost for workers compensation insurance.

The present invention also provides for a system to determine a final premium charge and more accurate real time estimate during the lifetime of the policy of workers compensation insurance associated with a risk, wherein the system as implemented at an insurance company comprises: a first engine monitoring a set of raw data elements, the raw data elements associated with any of, or a combination of, the following: the risk's employment practice, the risk's payroll, modification to the risk's payroll, or operating state of the risk; a second engine identifying and recording a subset of the raw data elements that have an identified relationship with any of, or a combination of, the following: the risk's business operation, insurability of the risk, or rating parameters associated with the risk's policy, and a workers compensation insurance estimator working in conjunction with the first and second engine to determine the final premium charge of workers compensation insurance of the risk based on a premium modification that increases or decreases a premium charge based on an evaluation of the recorded subset of raw data elements.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention contemplates a new and improved workers compensation monitoring, collecting, and communication system, which primarily overcomes the problem of determining a cost of insurance based upon data which does not take into consideration how a specific payroll changed during the life cycle of the policy. The subject invention will base insurance charges with regard to current material data representative of actual current payroll characteristics of the risk to provide a classification rating of each employee into an actuarial class which has a vastly reduced rating error over conventional insurance cost systems. Additionally, the present invention allows for ongoing adjustments to the cost of coverage because of the changes in the risk's number of employees and/or their payroll to said employees. This can result in workers compensation insurance charges that are readily controllable by the risk. The system is adaptable to current electronic payroll reporting systems, tracking systems and data upload systems for the improved extraction of selected insurance related data.

Figure 2:
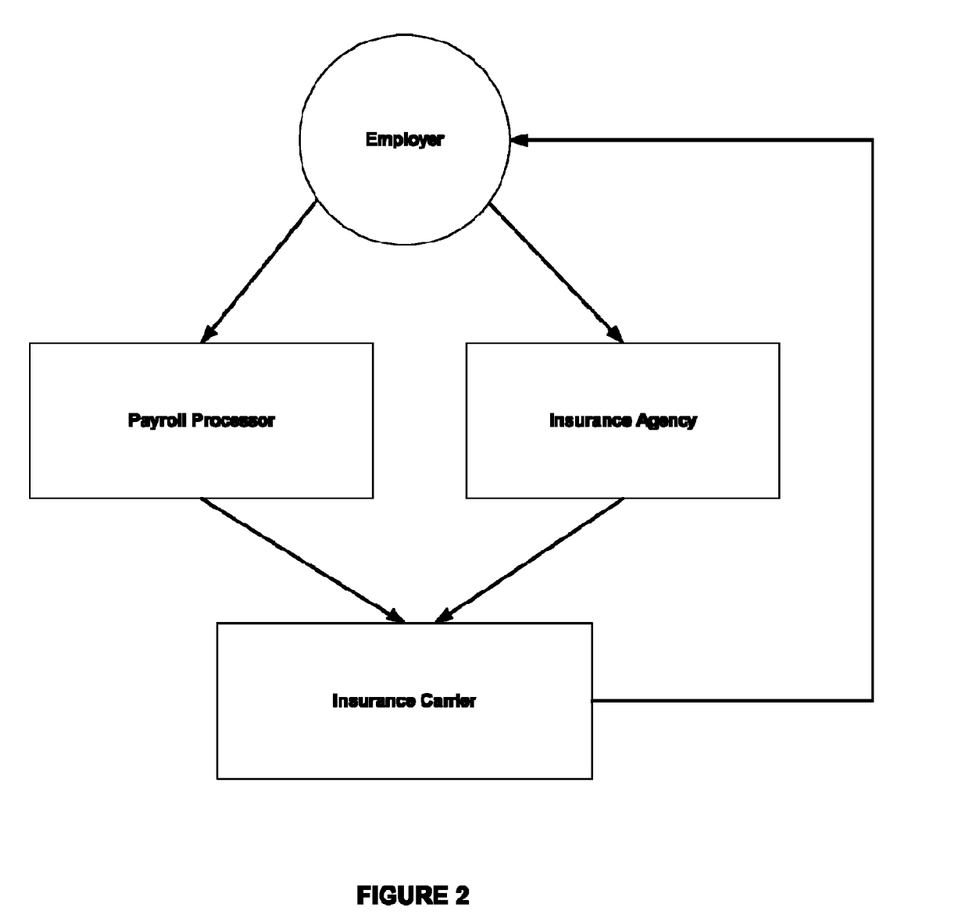
FIG. 2 illustrates the basic topology for implementing the present invention.

FIG. 2 illustrates the basic topology for implementing the present invention wherein the present invention's system and method (as implemented in the insurance carrier) communicates directly with the employer (which in turn works in conjunction with the depicted payroll processor and insurance agency) to receive real-time payroll data associated with the risk. The insurance carrier monitors the received real-time payroll data to identify and record raw data elements that have an identified relationship with any of, or a combination of, the following: said risk's business operation, insurability of said risk, character of said risk, or rating parameters associated with said risk's policy. The insurance company determines the final premium charge and more accurate real time estimate during the lifetime of the policy of workers compensation insurance for the risk based on a premium modification that increases or decreases a premium charge based on an evaluation of said recorded raw data elements.

Figure 3A:
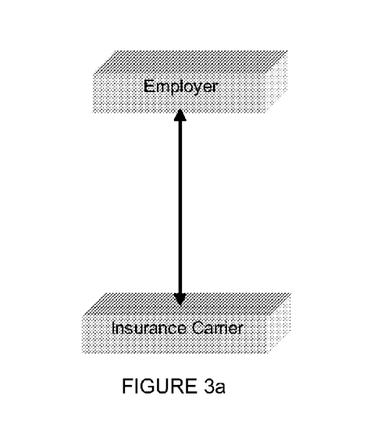
FIGS. 3a-d illustrate exemplary scenarios where the present invention's system and method are implemented at the insurance carrier.
Figure 3B:
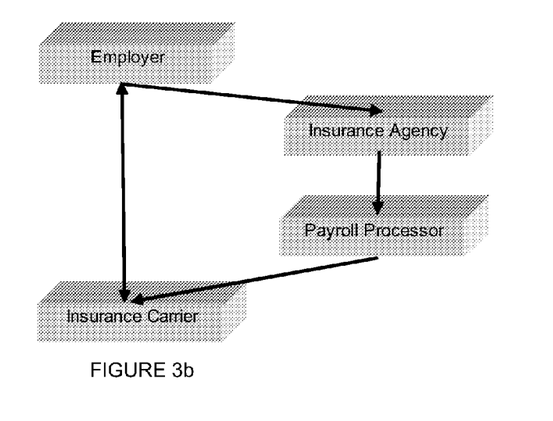
Figure 3C:
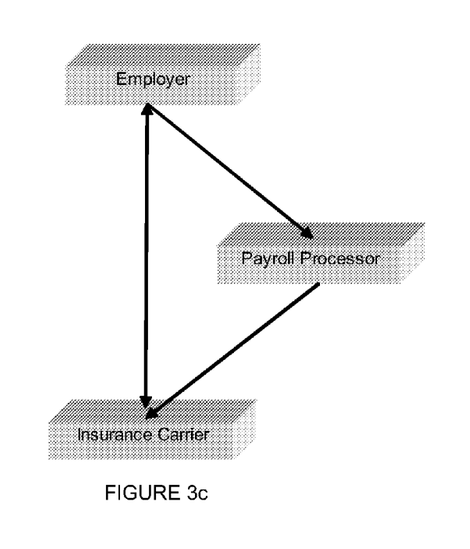
Figure 3D:
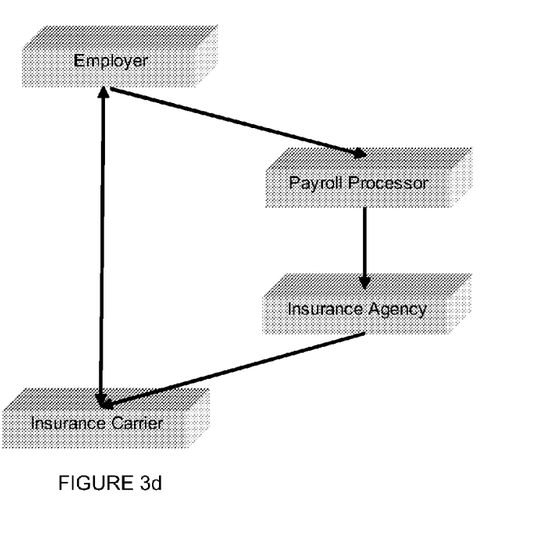

Although an example is shown in FIG. 2 illustrating the specific interaction between the employer, insurance carrier, payroll processor, and insurance agency, other variations are within the scope of the present invention. For example, FIGS. 3a-d illustrate exemplary scenarios where the present invention's system and method are implemented at the insurance carrier. FIG. 3a illustrates the specific scenario involving a large self-insured entity working in conjunction with the insurance carrier implementing the present invention. FIG. 3b illustrates another scenario wherein the employer works with a specific insurance agency and a specific payroll processor. FIG. 3c illustrates another scenario wherein the employer works in conjunction with only a payroll processor (and no insurance agency). FIG. 3d illustrates yet another scenario where the employer works with a payroll processor that has a preferred insurance agency. In the scenarios of FIG. 2 and FIGS. 3a-d, the insurance company works directly with the employer to determine the final premium charge and more accurate real time estimate during the lifetime of the policy of workers compensation insurance for the employer based on a premium modification that increases or decreases a premium charge based on an evaluation of recorded raw data elements.

Figure 4:
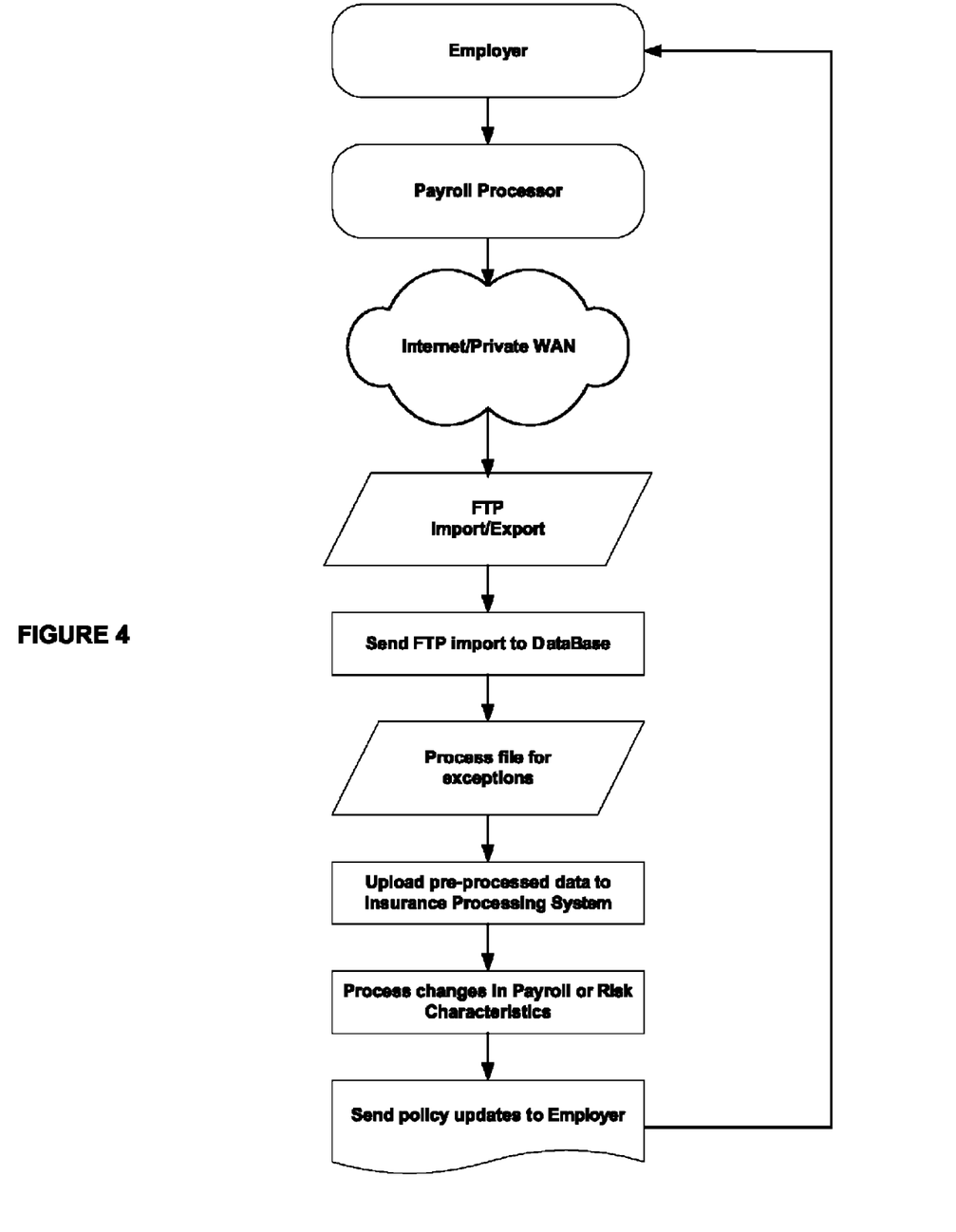
FIG. 4 illustrates a basic flow chart of the processing sequence of the present invention including an exception processing element.

FIG. 4 illustrates a basic flow chart of one embodiment of the processing sequence. In accordance therewith, there is disclosed a method of determining a cost of workers compensation insurance based upon monitoring, collecting and communicating data representative of the risk's characteristics, whereby the cost is adjustable by relating the payroll characteristics to predetermined actuarial rates. The method is comprised of steps of monitoring a plurality of raw data elements representative of an operating state of the risk's business. Selected ones of the plurality of raw data elements are recorded when they are determined to have an identified relationship to the rating parameters of the risk's policy. The recorded elements are consolidated for processing against an insured profile and for identifying a surcharge or discount to be applied to a base cost of workers compensation insurance. The total cost of insurance obtained from combining the base cost and surcharges or discounts is produced as a final cost to the risk, and is directly charged, or credited, directly to the risk via their finance plan.

The present invention provides for a computer-based method implemented at an insurance company to estimate a final premium charge for workers compensation insurance associated with a risk, wherein the method comprises: the insurance company receiving real-time payroll data associated with the risk; the insurance company monitoring the received real-time payroll data to identify and record raw data elements that have an identified relationship with any of, or a combination of, the following: the risk's business operation, insurability of the risk, character of the risk, or rating parameters associated with the risk's policy; and the insurance company determining the final premium charge of workers compensation insurance for said risk based on a premium modification that increases or decreases a premium charge based on an evaluation of said recorded raw data elements.

The present invention provides for a computer-based method to determine a final premium charge and more accurate real time estimate during the lifetime of the policy for workers compensation insurance associated with a risk, wherein the computer-based method comprises the steps of: monitoring a set of raw data elements, the raw data elements associated with any of, or a combination of, the following: the risk's employment practice, the risk's payroll, modification to the risk's payroll, or operating state of the risk; identifying and recording a subset of the raw data elements that have an identified relationship with any of, or a combination of, the following: the risk's business operation, insurability of the risk, character of the risk, or rating parameters associated with the risk's policy; and determining the final premium charge of workers compensation insurance of the risk based on a premium modification that increases or decreases a premium charge based on an evaluation of the recorded subset of raw data elements.

The present invention also provides for a business method implemented over a network to estimate a final premium charge and more accurate real time estimate during the lifetime of the policy for workers compensation insurance associated with a risk, wherein the business method comprising the steps of: monitoring a set of raw data elements, the raw data elements associated with any of, or a combination of, the following: the risk's employment practice, the risk's payroll, modification to the risk's payroll, or operating state of the risk; identifying and recording a subset of the raw data elements that have an identified relationship with any of, or a combination of, the following: the risk's business operation, insurability of the risk, or rating parameters associated with the risk's policy; determining the final premium charge of workers compensation insurance of the risk based on a premium modification that increases or decreases a premium charge based on an evaluation of the recorded subset of raw data elements; and generating revenue by performing a financial transaction over the network based on the determined final premium charge.

The present invention also provides for a method of determining a cost of workers compensation insurance for a selected period based upon monitoring, collecting and communicating data representative of the risk's payroll characteristics during said selected period, whereby the cost is adjustable by relating the payroll characteristics to predetermined actuarial rates and the method comprises the steps of: determining an initial profile and a base cost of workers compensation insurance based on the profile; monitoring a plurality of data elements representative of payroll and business status of a risk during said selected period; identifying and analyzing data elements among the plurality of data elements that have a pre-identified relationship to the risk's insurability; consolidating the analyzed data elements for identifying a surcharge or discount to be applied to the base cost; and producing a final cost of workers compensation insurance for the selected period from the base cost and the surcharges or discounts to be billed directly to the risk based on their finance plan, whereby the risk is charged or credited said final cost for workers compensation insurance.

In accordance with another aspect of the present invention, the collection process comprises identifying a trigger event associated with the raw data elements which has an identified relationship to the risk's policy conditions so that trigger information representative of the event is recorded.

In accordance with yet another aspect of the present invention, the method comprises steps of generating calculated data elements and derived data elements from the raw data elements, and accumulating the calculated and derived data elements in a proprietary database.

The present invention will use information acquired from the risk to more accurately assess the risk's business and thereby derive insurance costs more precisely and fairly. Examples of possible actuarial classes developed from risk provided data include:

Payroll
Number of employees
Job Classification
Payroll per employee

These new and more precise actuarial classes are considered to be better predictors of premium cost because they are based on actual payrolls dispersed by the risk. This will allow the risk more precise control over their cash flow because the cost of their insurance will match more precisely the actual real-time experience of the business.

One benefit obtained by use of the present invention is a system that will provide precise and timely information about the current operation of a risk's business that will enable an accurate determination of operating characteristics, including such features as number of employees, job duties and classifications, and amount of payroll. This information can be used to establish actual real-time, fact based, insurance charges, eliminating rating errors that are prevalent in traditional systems and will result in insurance charges that can be directly controlled by the risk. Charges and/or credits can then be immediately reflected directly to the risk via their finance plan. Also, the insured business and the carrier can benefit from applying Loss Control services as the exposures occur, to prevent injuries which then impact on the profitability of the account and future premium charges for the business.

It is another benefit of the subject invention that conventional payroll processing company's database interfaces are easily supplemented and interfaced by our database system components to extract selected insurance relevant data from the risk.

It is yet another object of the present invention to generate actuarial classes and risk profiles relative thereto based upon actual business characteristics of the risk, as represented by the monitored and recorded data elements for providing a more knowledgeable, enhanced insurance rating precision.

The subject new insurance rating system retrospectively adjusts and prospectively sets premiums based on data derived from risk supplied characteristics throughout the policy period through the generation of new actuarial classes determined from such characteristics, which classes heretofore have been unknown in the insurance industry.

Other benefits and advantages of the subject new insurance cost determination process will become apparent to those skilled in the art upon a reading and understanding of the specification.

One of the useful consequences of the subject invention is that other products could be marketed to a particular risk based on information provided from the subject invention from the risk's business. Since the invention includes processes for gathering, extracting and analyzing information provided by the risk, a more informed judgment can be made about a determination of when and which products could be marketed to that risk.

The present invention process benefits the insurance company because changes to characteristics of the risk can be immediately reflected in the policy's premium and charged directly to the risk according to the terms of the policy's finance plan. This not only allows the risk to have better cash flow management opportunities, but, also, the insurance company experiences the benefit of immediately realizing their exposure. The charge that is generated directly to the risk is also a cash flow management tool that is better than traditional "charge back" methods because the insurance company enjoys the immediate availability of funds, as opposed to waiting for the audit results, or, as opposed to waiting for the charge-back through a payroll-processor, and takes responsibilities for the calculation of premium and fees.

The invention has been described with reference to preferred embodiments. Obviously, modifications and alterations will occur to others upon a reading and understanding of the specification. It is our intention to include all such modifications and alterations insofar as they come within the scope of the appended claims or the equivalents thereof.

Additionally, the present invention provides for an article of manufacture comprising computer readable program code contained within implementing one or more modules to determine cost of workers compensation insurance based upon monitoring, collecting and communicating data representative of the risk's "real time" number of employees, classification of employees, payroll, and other characteristics by acquiring this data through the risk's "payroll processor".

The present invention also provides for a system to determine a final premium charge and more accurate real time estimate during the lifetime of the policy of workers compensation insurance associated with a risk, wherein the system as implemented at an insurance company comprises: a first engine monitoring a set of raw data elements, the raw data elements associated with any of, or a combination of, the following: the risk's employment practice, the risk's payroll, modification to the risk's payroll, or operating state of the risk; a second engine identifying and recording a subset of the raw data elements that have an identified relationship with any of, or a combination of, the following: the risk's business operation, insurability of the risk, or rating parameters associated with the risk's policy, and a workers compensation insurance estimator working in conjunction with the first and second engine to determine the final premium charge of workers compensation insurance of the risk based on a premium modification that increases or decreases a premium charge based on an evaluation of the recorded subset of raw data elements.

Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides for an article of manufacture comprising a computer usable medium having computer readable program code embodied therein which implements a method to estimate a final premium charge and more accurate real time estimate during the lifetime of the policy for workers compensation insurance associated with a risk, wherein the medium comprises: computer readable program code monitoring a set of raw data elements, the raw data elements associated with any of, or a combination of, the following: the risk's employment practice, the risk's payroll, modification to the risk's payroll, or operating state of the risk; computer readable program code identifying and recording a subset of the raw data elements that have an identified relationship with any of, or a combination of, the following: the risk's business operation, insurability of the risk, character of the risk, or rating parameters associated with the risk's policy; and computer readable program code determining the final premium charge of workers compensation insurance of the risk based on a premium modification that increases or decreases a premium charge based on an evaluation of said recorded subset of raw data elements.

CONCLUSION

A system and method has been shown in the above embodiments for the effective implementation of workers compensation system for determining a cost of insurance. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited to the preferred embodiment workman's compensation calculation; other insurance types and programs can benefit from the present invention without departing from the scope thereof. Also, software/program, computing environment, or specific computing hardware, should not limit the invention.

The above enhancements are implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of database programming.

The invention claimed is:

1. An article of manufacture having a computer readable medium storing computer readable program code that is executed by a computer to implement a method to determine a final premium charge for workers compensation insurance associated with a risk, said medium comprising:

computer readable program code stored in a storage at said insurance carrier when executed by said computer establishes communication over a network with said risk's payroll processor and receives at said insurance carrier, in real-time over said network, a set of raw data elements, said payroll processor located remote from said insurance carrier and said set of raw data elements associated with an operating state of said risk and any of the following: said risk's employment practice, said risk's payroll, or a modification to said risk's payroll, said operating state comprising a plurality of the following: number of employees, job classification, or payroll per employee;

computer readable program code stored in a storage at said insurance carrier when executed by said computer monitors said set of raw data elements received in real-time over said network;

computer readable program code stored in a storage at said insurance carrier when executed by said computer identifies and records a subset of said raw data elements among said set of raw data elements received in real-time from said risk's payroll processor that have an identified relationship with any of, or a combination of, the following: said risk's business operation, insurability of said risk, character of said risk, or rating parameters associated with said risk's policy;

computer readable program code stored in a storage at said insurance carrier when executed by said computer determines said final premium charge of workers compensation insurance of said risk based on a premium modification that increases or decreases a premium charge based on an evaluation of said recorded subset of raw data elements, wherein said final premium charge is adjustable by relating payroll characteristics obtained in real-time over a network from said risk's payroll processor to predetermined actuarial rates; and computer readable program code stored in a storage at said insurance carrier when executed by said computer outputs said determined final premium charge of workers compensation insurance.

2. The article of manufacture of claim 1, wherein said medium further comprises:

computer readable program code calculating data elements and derived data elements from said raw data elements, and storing said calculated and derived data elements in a database.

3. The article of manufacture of claim 1, wherein said medium further comprises:

computer readable program code identifying a trigger event associated with at least one of said raw data elements; and computer readable program code recording trigger information associated with said trigger event, computer readable program code wherein said recorded trigger information in combination with said recorded raw data elements with an identified relationship is used to identify said surcharge or discount.

4. The article of manufacture of claim 1, wherein said medium further comprises computer readable program code interfacing with an existing database associated with said risk to extract additional insurance relevant data.

5. The article of manufacture of claim 1, wherein said computer-based method is performed over a network.

6. The article of manufacture of claim 5, wherein said network is any of the following: local area network (LAN), wide area network (WAN), or the Internet.

7. An article of manufacture comprising a computer readable medium storing computer readable program code that is executed by a computer to implement a method to estimate a final premium charge for workers compensation insurance associated with a risk, said medium comprising:

computer readable program code stored in a storage at said insurance carrier when executed by said computer establishes communication over a network with said risk's payroll processor and receives at said insurance carrier, in real-time over said network, a set of raw data elements, said payroll processor located remote from said insurance carrier and said set of raw data elements associated with an operating state of said risk and any of the following: said risk's employment practice, said risk's payroll, or a modification to said risk's payroll, said operating state comprising a plurality of the following: number of employees, job classification, or payroll per employee;

computer readable program code stored in a storage at said insurance carrier when executed by said computer monitors said set of raw data elements received in real-time over said network;

computer readable program code stored in a storage at said insurance carrier when executed by said computer identifies and records a subset of said raw data elements among said set of raw data elements received in real-time from said risk's payroll processor that have an identified relationship with any of, or a combination of, the following: said risk's business operation, insurability of said risk, character of said risk, or rating parameters associated with said risk's policy;

computer readable program code stored in a storage at said insurance carrier identifies a trigger event associated with at least one of said raw data elements received in real-time from said payroll processor;

computer readable program code stored in a storage at said insurance carrier records trigger information associated with said trigger event;

computer readable program code stored in a storage at said insurance carrier when executed by said computer determines said final premium charge of workers compensation insurance of said risk based on a premium modification that increases or decreases a premium charge based on an evaluation of said recorded subset of raw data elements and said recorded trigger information, wherein said final premium charge is adjustable by relating payroll characteristics obtained in real-time over a network from said risk's payroll processor to predetermined actuarial rates; and computer readable program code stored in a storage at said insurance carrier when executed by said computer outputs said determined final premium charge of workers compensation insurance.

8. A business method implemented over a network comprising:

estimating a final premium charge for workers compensation insurance associated with a risk, said estimation implemented by executing computer readable program code stored on an article of manufacture having a computer readable medium storing, said estimation comprising:

executing computer readable program code by said computer to establish a communication over a network with said risk's payroll processor and receive at said insurance carrier, in real-time over said network, a set of raw data elements, said payroll processor located remote from said insurance carrier and said set of raw data elements associated with an operating state of said risk and any of the following: said risk's employment practice, said risk's payroll, or a modification to said risk's payroll, said operating state comprising a plurality of the following: number of employees, job classification, or payroll per employee;

executing computer readable program code by said computer to monitor said set of raw data elements received in real-time over a network at an insurance carrier from said risk's payroll processor;

executing computer readable program code by said computer to identify and record a subset of said raw data elements among said set of raw data elements received in real-time from said risk's payroll processor that have an identified relationship with any of, or a combination of, the following: said risk's business operation, insurability of said risk, or rating parameters associated with said risk's policy;

executing computer readable program code by said computer to determine said final premium charge of workers compensation insurance of said risk based on a premium modification that increases or decreases a premium charge based on an evaluation of said recorded subset of raw data elements, wherein said final premium charge is adjustable by relating payroll characteristics obtained in real-time over a network from said risk's payroll processor to predetermined actuarial rates; and generating revenue by performing a financial transaction over said network based on said determined final premium charge.

9. The business method of claim 8, wherein said estimation further comprises:

executing computer readable program code by said computer to calculate data elements and derived data elements from said raw data elements, and executing computer readable program code by said computer to store said calculated and derived data elements in a database.

10. The business method of claim 8, wherein said estimation further comprises:

executing computer readable program code by said computer to identify a trigger event associated with at least one of said raw data elements; and executing computer readable program code by said computer to record trigger information associated with said trigger event, wherein said recorded trigger information in combination with said recorded raw data elements with an identified relationship is used to identify said surcharge or discount.

11. The business method of claim 8, wherein said estimation further comprises executing computer readable program code by said computer to interface with an existing database associated with said risk to extract additional insurance relevant data.

12. The business method of claim 8, wherein said business method is performed over a network.

13. The business method of claim 12, wherein said network is any of the following: local area network (LAN), wide area network (WAN), or the Internet.

* * * * *

UNITED STATES PATENT AND TRADEMARK OFFICE
CERTIFICATE OF CORRECTION

| | | |
|---|---|---|
| PATENT NO. | : 8,538,781 B2 | Page 1 of 1 |
| APPLICATION NO. | : 11/381676 | |
| DATED | : September 17, 2013 | |
| INVENTOR(S) | : Richardson et al. | |

It is certified that error appears in the above-identified patent and that said Letters Patent is hereby corrected as shown below:

In the Specification

Col. 1, line 7, delete "60/577,410" and insert therefore --60/677,410--.

Signed and Sealed this
Nineteenth Day of November, 2013

Teresa Stanek Rea
*Deputy Director of the United States Patent and Trademark Office*